United States Patent
Thorslund et al.

(10) Patent No.: US 11,349,820 B2
(45) Date of Patent: May 31, 2022

(54) SELECTIVE ENCRYPTION OF TUNNELED ENCRYPTED TRAFFIC

(71) Applicant: Citrix Systems, Inc., Fort Lauderdale, FL (US)

(72) Inventors: Derek Thorslund, Santa Clara, CA (US); Vladimir Vysotsky, Santa Clara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 124 days.

(21) Appl. No.: 16/517,146

(22) Filed: Jul. 19, 2019

(65) Prior Publication Data
US 2021/0021579 A1    Jan. 21, 2021

(51) Int. Cl.
*H04L 29/06*    (2006.01)
*H04L 9/40*    (2022.01)

(52) U.S. Cl.
CPC ...... *H04L 63/0471* (2013.01); *H04L 63/0464* (2013.01)

(58) Field of Classification Search
CPC ............. H04L 63/0272; H04L 63/0281; H04L 63/029; H04L 63/0464; H04L 63/0471; H04L 63/0478
See application file for complete search history.

(56) References Cited

U.S. PATENT DOCUMENTS

| | | | | |
|---|---|---|---|---|
| 8,745,373 | B2 * | 6/2014 | Molsberry | H04L 63/0428 |
| | | | | 713/153 |
| 2016/0315920 | A1 | 10/2016 | Kurmala et al. | |
| 2017/0346854 | A1 | 11/2017 | Kumar et al. | |
| 2020/0304477 | A1 * | 9/2020 | Venkataraman | .... H04L 63/0272 |

FOREIGN PATENT DOCUMENTS

| | | | |
|---|---|---|---|
| EP | 3 664 407 A1 | 6/2020 | |
| WO | WO-2019107794 A1 * | 6/2019 | ............. H04L 29/06 |

OTHER PUBLICATIONS

International Search Report on International Appl. No. PCT/US2020/042095, dated Oct. 6, 2020.
International Preliminary Report on Patentability on PCT/US2020/042095, dated Feb. 3, 2022.

* cited by examiner

*Primary Examiner* — Madhuri R Herzog
(74) *Attorney, Agent, or Firm* — Foley & Lardner LLP

(57) ABSTRACT

Described embodiments provide systems and methods for selectively encrypting and decrypting portions of a network flow by intermediary devices. A first device may identify a protocol used by a network flow traversing the first device via one or more packets of the protocol. The first device may determine that a level of encryption for the network flow meets a predetermined threshold. The first device may receive networks packets to be communicated between a sender and a receiver. The packets may include a first portion that is encrypted and a second portion that has clear text information. The first device may encrypt the second portion of the one or more packets. The first device may forward the network packets with the first portion and the encrypted second portion via a tunnel to a second device for decryption of the encrypted second portion for forwarding to the receiver.

16 Claims, 3 Drawing Sheets

SELECTIVE ENCRYPTION OF TUNNELED ENCRYPTED TRAFFIC

FIELD OF THE DISCLOSURE

The present application generally relates to encryption, including but not limited to systems and methods for selective encryption of tunneled traffic.

BACKGROUND

In a computing environment in which multiple computing devices are connected, one device may request, download, or otherwise retrieve data from a second device. In some implementations, the second device may encrypt the data prior to transmitting, sending, communicating, or otherwise providing the data to the first device. The second device may encrypt the data to secure the data for transmission to the first device. The first device may receive the data and decrypt the data.

SUMMARY

This Summary is provided to introduce a selection of concepts in a simplified form that are further described below in the Detailed Description. This Summary is not intended to identify key features or essential features, nor is it intended to limit the scope of the claims included herewith.

The following disclosure is directed to systems and methods for selective encryption of tunneled traffic. Various intermediary or other network devices may be arranged, located, or otherwise situated between senders and receivers of data (e.g., clients and servers, for instance). In a Software-Defined Wide-Area Network (SD-WAN) environment, network traffic may be delivered between physical and virtual sites using a combination of virtual network tunnels, and identification and classification of applications and/or network protocols. The virtual network tunnels may use multiple underlying network connections for redundancy and scalability, and may be encrypted to provide privacy and/or security. In some implementations, network traffic may be encrypted based on classification of applications and/or network protocols to implement application-specific delivery and/or quality of service rules.

With many sender and recipient data transfer protocols, such as HTTP, most payload data may be encrypted by the sender. However, encryption algorithm header information and initial phases of the protocol exchange may not be encrypted. Such embodiments may expose data to potential interception. According to the improvements described herein, in an SD-WAN environment for instance, the systems and methods described herein may selectively encrypt portions of network traffic based on the encryption protocols used by the sender. For instance, where a sender sends packets for known protocols utilizing strong encryption, an intermediary device may encrypt initial protocol exchange packets and/or any plain text header information, but not "double encrypt" the payload data. The embodiments described herein may reduce processing overhead and latency by avoiding unnecessary encryption of the already adequately encrypted payload data.

In some implementations, a first device (which may be intermediary to senders and receivers, such as a SD-WAN device or appliance) may identify a protocol used by a network flow traversing the first device via one or more packets of the protocol. The first device may determine (e.g., based on the protocol) that a level of encryption for the network flow meets a predetermined threshold. The first device may receive network packet(s) to be communicated between a sender and receiver. The network packet(s) may include an encrypted portion (e.g., a first portion) and a clear text portion (e.g., a second portion having clear text or unencrypted information). The first device may encrypt the second, clear text portion. The first device may forward the network packet(s) with both portions encrypted, via a tunnel to a second device for decryption and forwarding to the receiver.

According to the embodiments described herein, rather than performing encryption on all packets, the systems and methods described herein may selectively encrypt portions of packets. While encryption of all packets and for all bytes in each packet may result in predictable performance and reliable security characteristics, it may be possible to increase network traffic throughput by identifying portions of packets that are already strongly encrypted, and forwarding such packets without additional encryption. In an SD-WAN implementation, various intermediary devices may be suitable for such selective encryption, as the intermediary devices may be implemented to perform packet inspection and/or application classification as part of their functionality.

In one aspect, this disclosure is directed to a method for selectively encrypting and decrypting portions of a network flow by intermediary devices. The method may include identifying, by a first device intermediary to a plurality of senders and a plurality of receivers, a protocol used by a network flow traversing the first device via one or more packets of the protocol. The method may include determining, by the first device based at least on the protocol, that a level of encryption for the network flow meets a predetermined threshold. The method may include receiving, by the first device, one or more networks packets to be communicated between a sender of the plurality of senders and a receiver of the plurality of receivers. The one or more packets may include a first portion that is encrypted and a second portion that has clear text information. The method may include encrypting, by the first device based at least on the protocol, the second portion of the one or more packets. The method may include forwarding, by the first device, the one or more network packets with the first portion and the encrypted second portion via a tunnel to a second device intermediary to the plurality of senders and the plurality of receivers for decryption of the encrypted second portion for forwarding to the receiver.

In some embodiments, identifying the protocol includes identifying the protocol during one of negotiation or renegotiation of the protocol between the sender and the receiver. In some embodiments, the method further includes identifying one or more parameters of the encryption to be used by the protocol. In some embodiments, identifying the protocol includes performing, by the first device, inspection of the one or more packets to identify one of the protocol or the level of encryption. In some embodiments, determining that the level of encryption for the network flow meets the predetermined threshold includes avoiding, by the first device responsive to the determination, encrypting the first portion of the one or more network packets to be forwarded via the tunnel to the second device.

In some embodiments, the method further includes identifying, by the first device, an application of the network flow. In some embodiments, the method further includes identifying, by the first device, one or more encryption rules to partially encrypt portions of network traffic based at least on the application. In some embodiments, the method further includes encrypting, by the first device, portions of the network traffic according to the one or more encryption rules. In some embodiments, the method further includes determining, by the first device, that a second protocol of a second network flow has a second level of encryption below the predetermined threshold. In some embodiments, the method further includes encrypting, by the first device, encrypted portions of the second network flow for transmission via the tunnel.

In another aspect, this disclosure is directed to a system for selectively encrypting and decrypting portions of a network flow by intermediary devices. The system may include a first device comprising one or more processors, coupled to memory and intermediary to a plurality of senders and a plurality of receivers. The first device may be configured to identify a protocol used by a network flow traversing the first device via one or more packets of the protocol. The first device may be configured to determine, based at least on the protocol, that a level of encryption for the network flow meets a predetermined threshold. The first device may be configured to receive one or more networks packets to be communicated between a sender of the plurality of senders and a receiver of the plurality of receivers. The one or more packets may include a first portion that is encrypted and a second portion that has clear text information. The first device may be configured to encrypt, based at least on the protocol, the second portion of the one or more packets. The first device may be configured to forward, the one or more network packets with the first portion and the encrypted second portion via a tunnel to a second device intermediary to the plurality of senders and the plurality of receivers for decryption of the encrypted second portion for forwarding to the receiver.

In some embodiments, the first device is further configured to identify the protocol during one of negotiation or renegotiation of the protocol between the sender and the receiver. In some embodiments, the first device is further configured to identify one or more parameters of the encryption to be used by the protocol. In some embodiments, the first device is further configured to perform inspection of the one or more packets to identify one of the protocol or the level of encryption. In some embodiments, the first device is further configured to avoid, responsive to the determination, encrypting the first portion of the one or more network packets to be forwarded via the tunnel to the second device. In some embodiments, the first device is further configured to identify an application of the network flow. In some embodiments, the first device is further configured to identify one or more encryption rules to partially encrypt portions of network traffic based at least on the application. In some embodiments, the first device is further configured to encrypt portions of the network traffic according to the one or more encryption rules. In some embodiments, the first device is further configured to determine that a second protocol of a second network flow has a second level of encryption below the predetermined threshold. In some embodiments, the first device is further configured to encrypt encrypted portions of the second network flow for transmission via the tunnel.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a computing environment which may be useful for practicing embodiments described herein.

Section B describes systems and methods for selective encryption of tunneled traffic.

A. Computing Environment

Prior to discussing the specifics of embodiments of the systems and methods detailed herein in Section B, it may be helpful to discuss the computing environments in which such embodiments may be deployed.

Figure 1:
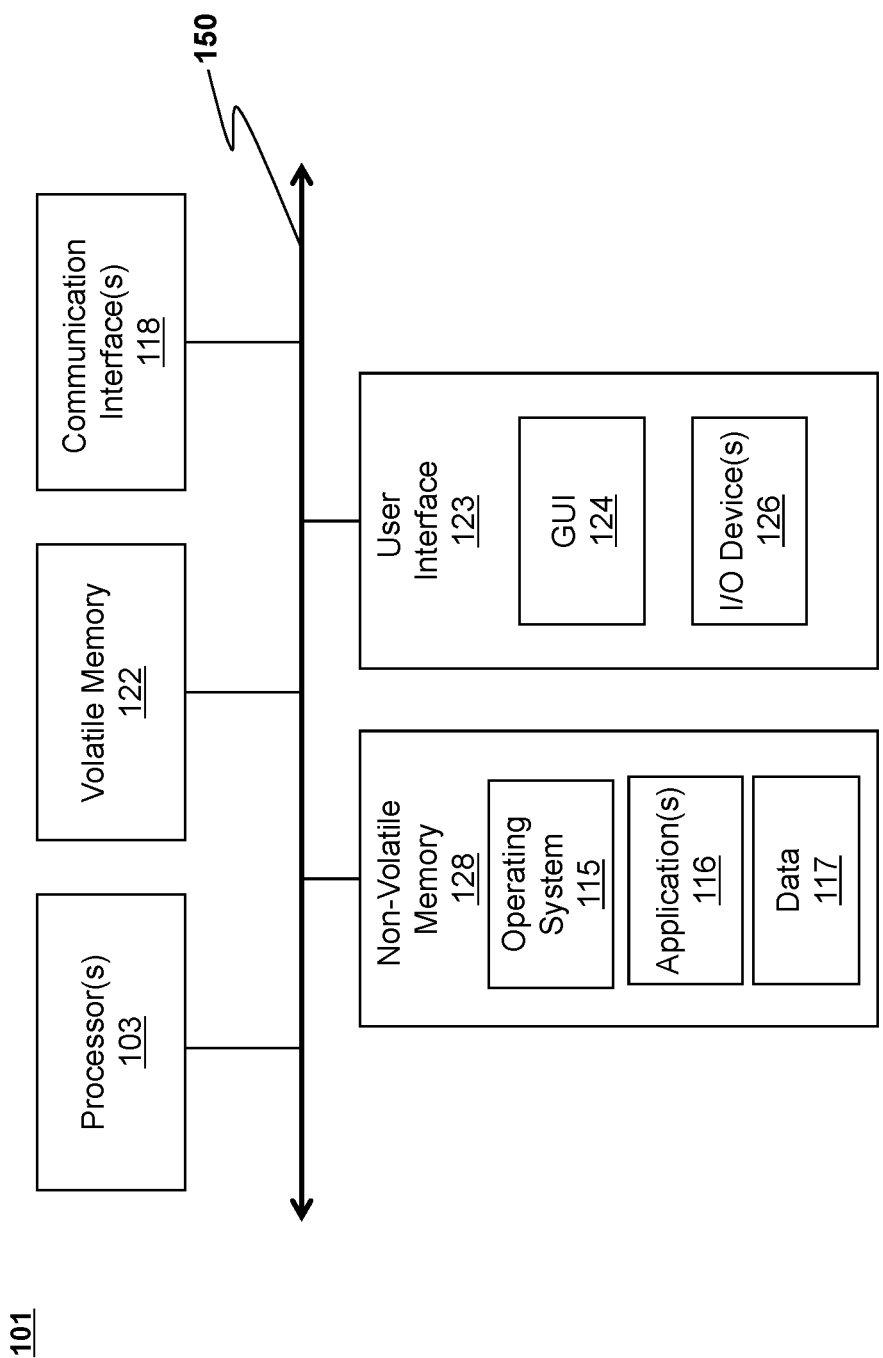
FIG. 1 is a block diagram of a network computing system, in accordance with an illustrative embodiment.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

B. Systems and Methods for Selective Encryption of Tunneled Encrypted Traffic

The following disclosure is directed to systems and methods for selective encryption of tunneled traffic. Various intermediary or other network devices may be arranged, located, or otherwise situated between senders and receivers of data (e.g., clients and servers, for instance). In a SD-WAN environment, network traffic may be delivered between physical and virtual sites using a combination of virtual network tunnels and identification and classification of applications and network protocols. The virtual network tunnels may use multiple underlying network connections and may be encrypted to provide privacy and security Most payload data may be encrypted by the sender. However, encryption algorithm header information and/or initial phases of the protocol exchange may not be encrypted. Such embodiments may expose data to potential interception. According to the improvements described herein, the systems and methods described herein may selectively encrypt portions of network traffic based on the encryption protocols used by the sender. For instance, where a sender sends packets for known protocols utilizing strong encryption, an intermediary device may encrypt initial protocol exchange packets and/or the plain text header information, but not "double encrypt" the payload data. To double encrypt, or apply another layer of encryption over an encrypted payload data would consume significant processing resources, and can reduce the throughput of an SD-WAN device for instance, which is inefficient and redundant if the existing encryption is sufficient strong to ensure privacy and/or security. The embodiments described herein may selectively encrypt portion(s) of the network traffic that is determined to be insufficiently protected (e.g., by encryption, or according to the trustworthiness of the source application or user), or having a significant likelihood that these may be insufficiently protected. Hence, by identifying portion(s) of the network traffic to perform encryption while bypassing encryption on other portions (which can be significantly more than, such as multiple times in size as compared to) the former, the present systems and methods can reduce processing overhead and/or latency, and increase the throughput of the intermediary device, by avoiding unnecessary encryption of the already encrypted portions of the network traffic (e.g., the payload data).

In some implementations, a first device (which may be intermediary to senders and receivers, such as an SD-WAN device) may identify a protocol used by a network flow traversing the first device via one or more packets of the protocol. The first device may determine (e.g., based on the protocol) that a level of encryption for the network flow meets a predetermined threshold. The first device may receive network packet(s) to be communicated between a sender and receiver. The network packet(s) may include an encrypted portion (e.g., a first portion) and a clear text or unencrypted portion (e.g., a second portion having clear text information). The first device may encrypt the second, clear text portion. The first device may forward the network packet(s) with both portions encrypted, via a tunnel to a second device for decryption and forwarding to the receiver.

According to the embodiments described herein, rather than performing encryption on all packets, the systems and methods described herein may selectively encrypt portions (e.g., unencrypted or clear text portions) of packets. Instead of encrypting all packets and for all bytes in each packet, it may be possible to increase network traffic throughput by identifying portions of packets that are already strongly encrypted, and forwarding such packets without additional encryption. In an SD-WAN implementation for instance, various intermediary devices may be suitable for such selective encryption, as such intermediary devices may be implemented to perform packet inspection and application classification as part of their functionality.

Figure 2:
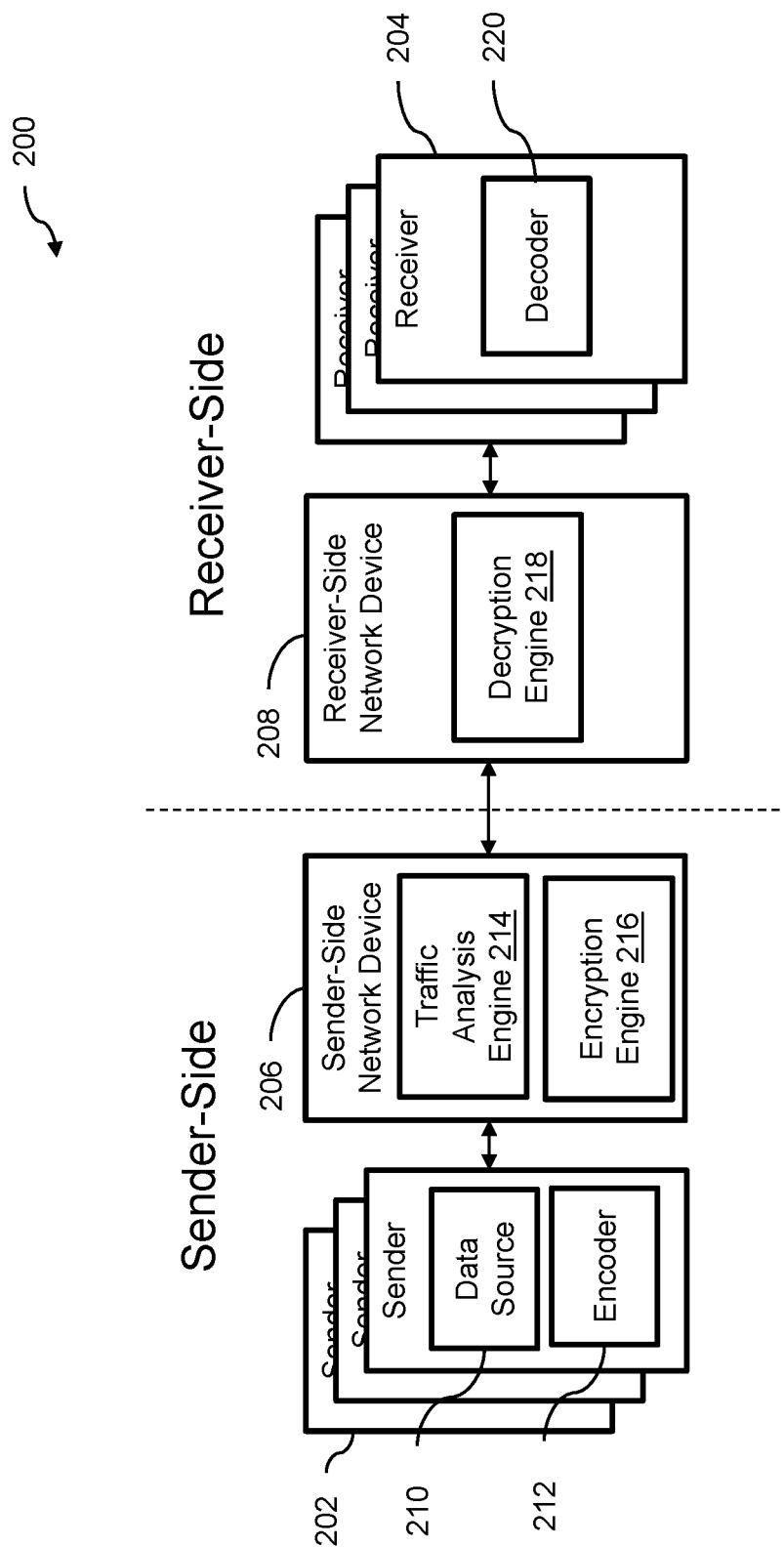
FIG. 2 is a block diagram of a system for selective encryption of tunneled traffic, in accordance with an illustrative embodiment.

Referring now to FIG. 2, depicted is a system 200 for selective encryption of tunneled traffic. The system 200 may include a plurality of senders 202 and a plurality of receivers 204, a sender-side network device 206, and a receiver-side network device 208. The sender-side network device 206 (e.g., a sender-side SD-WAN device) may be configured to identify a protocol used by a network flow traversing the device 206 via one or more packets of the protocol. The device 206 may be configured to determine that a level of encryption for the network flow meets a predetermined threshold. The sender-side network device 206 may be configured to receive one or more packets to be communicated between one of the senders 202 and one of the receivers 204. The packet(s) may include a first portion, which is encrypted, and a second portion, which includes clear text information. The device 206 may be configured to encrypt the second portion of the packet(s), and forward the packet(s) to the receiver-side network device 208 (e.g., via a tunnel). The device 208 may be configured to decrypt the second portion of the packet(s) and forward the packet(s) to the receiver 204.

The systems and methods of the present solution may be implemented in any type and form of device, including clients, servers and/or appliances described above with reference to FIG. 1. For instance, the sender(s) 202 may be implemented at, as, or a component of a server (or client device) and the receiver(s) 204 may be at, as, or a component of a client device (or server). In some implementations, the sender-side and receiver-side network devices 206, 208 may be implemented at, as, or a component of an intermediary device/appliance arranged between the sender(s) 202 and receiver(s) 204. The sender(s) 202 may perform a handshake with the sender-side network device 206 (e.g., to establish a connection between themselves), and the receiver(s) 204 may perform a handshake with the receiver-side network device 208 (e.g., to establish a connection between themselves). While one sender-side network device 206 and one receiver-side network device 208 are shown in FIG. 2, it is noted at that the system 200 may include any number of sender and receiver-side network devices 206, 208, which may be in a handshake with any number of sender(s) 202 and receiver(s) 204. The sender(s) 202, receiver(s) 204, and device(s) 206, 208 may include or incorporate components and devices similar in some aspects to those described above with reference to FIG. 1, such as a memory and/or one or more processors operatively coupled to the memory. The present systems and methods may be implemented in any embodiments or aspects of the appliances or devices described herein.

In some embodiments, the network devices 206, 208 (in combination with the senders 202 and receivers 204) may form or establish a software defined wide-area network (SD-WAN). The network devices 206, 208 may support communications in accordance with multi-stream remote access protocols, such as Independent Computing Architecture (ICA), High-Definition User Experience (HDX) display remoting protocols, and Remote Desktop Protocol (RDP). With multi-stream remote access, the network devices 206, 208 may control quality of service (QoS) (e.g., a range for packet loss, bit rate, throughput, delay, and jitter) for different virtual channels and may have separate ports for delivery of various resources. The network devices 206, 208 may also perform other functions in connection with the communications, such as data compression and caching.

An SD-WAN configuration may involve at least one client (e.g., a receiver 204) executing at least one application (e.g., workspace application), at least one receiver-side network device 208 (e.g., a client-side SD-WAN appliance or device), at least one sender-side network device 206 (e.g., a server-side SD-WAN appliance or device), at least one delivery agent (e.g., a virtual delivery agent (VDA)) residing on a server, and at least one server (e.g., a sender 202) hosting an application (e.g., data source 210) corresponding to an workspace application for instance. For example, the sender-side network device 206 and receiver-side network device 208 may each support or facilitate a set of virtual channels for communications between the senders 202 and receivers 204, among others components.

A receiver 204 (e.g., a client) may request to launch an application at the receiver 204 to access the data source 210 hosted on, executing at, or otherwise residing at the sender 202 (e.g., at a server). The data source 210 (e.g., a network application such as a virtual application, virtual desktop, SaaS application, or web application hosted on the server) may be accessed on the receiver 204 via a corresponding application on the receiver 204. The corresponding application may include a single program or a set of programs accessible via a remote desktop. The sender 202 may receive the request for data from the data source 210 (e.g., the application) from the receiver 204. Upon receipt of the request, the sender 202 may commence execution of the application to remotely provision or deliver data corresponding thereto to the receiver 204. The sender 202 may provide access of the data source 210 to the receiver 204 using a set of virtual channels established between the sender 202 and receiver 204 through the network devices 206, 208. Each virtual channel may communicate a stream of packets between the data source 210 running on the sender 202 and the receiver 204. A pair of network devices 206, 208 can support or carry between/across themselves traffic comprising a plurality of streams or tunnels of traffic. These tunnels can refer to virtual channels (VCs) established using ICA protocol for instance, but there are other possibilities, including multiple layers of protocols. For instance, the traffic flowing through the network devices 206, 208 can have one or more protocols such as transmission control protocol (TCP) or transport layer security (TLS), enlightened data transport (EDT) or datagram transport layer security (DTLS) or user datagram protocol (UDP), common gateway protocol (CGP), ICA framing, custom ICA encryption (e.g. secure ICA), ICA protocol itself (e.g., including compression, such as stateful context-based compression) and interleaving of individual core ICA or VC data streams, and the individual VC protocols.

As shown in FIG. 2, the system 200 may include one or more senders 202. The senders 202 may include server(s), client device(s), network or other intermediary devices, and so forth. The sender(s) 202 may include a data source 210 comprising data. In some implementations, the data source 210 may be an application which generates data. In other implementations, the data source 210 may include memory which stores data. In these and other embodiments, the data source 210 may be designed or implemented to store, include, access, or generate data which may be transmitted (e.g., as one or more packets) to a receiver (also referred to as a recipient) 204. The sender(s) 202 may be configured to transmit data from the data source(s) 210 to recipient(s) 204 (e.g., responsive to a request from the recipients 204, during use of an application by the recipient(s) 204, and so forth).

The sender(s) 202 may include an encoder 212. The encoder 212 may be any device, component, element, application, software, protocol, or other circuitry designed or implemented to encrypt or encode data to be transmitted to a receiver 204. In some implementations, the encoder 212 may be configured to encode data from the data source 212 to be transmitted to the receiver 204. In some implementations, the encoder 212 may be configured to negotiate a protocol between the sender 202 and receiver 204. Various examples of such protocols include HyperText Transfer Protocol (HTTP), Secured HyperText Transfer Protocol (HTTPS), Transport Layer Security (TLS), Datagram Transport Layer Security (DTLS), Secure Real-Time Transport Protocol (SRTP), IP Security (IPSec), OpenVPN, or other protocols described above.

The sender(s) 202 may be configured to route, deliver, forward, or otherwise transmit network traffic (e.g., negotiation packets for negotiating a protocol, packets including data from the data source 210, etc.) to the receiver 204 through one or more network devices 206, 208. In some implementations, the sender 202 may be configured to transmit network traffic to the sender-side network device 206, and the sender-side network device 206 may forward the network traffic to the receiver-side network device 208 for forwarding to a corresponding receiver 204. In this regard, network traffic may flow through the network devices 206, 208 between the senders and receivers 202, 204.

During negotiation (or renegotiation) of a protocol for encoding or encrypting network flow between a sender and receiver 202, 204, initial phase communications and packets of the protocol exchange may be exchanged between the sender and receiver 202, 204 to negotiate the protocol. In some implementations, initial phase communications and packets for negotiating such protocols may not necessarily be encrypted. Hence, at least some packets may include clear text (e.g., data or information readily accessible or read from the packet(s) without performing decryption and/or decoding). Following negotiation of the protocol, the encoder 212 may be configured to encrypt packets for the network flow between the sender 202 and receiver 204 in accordance with the negotiated/re-negotiated protocol. Some protocols may include portions of packets which are encrypted (for instance, a body or payload of the packet), and other portions which are not encrypted (e.g., the header and/or trailer of the packet). Some protocols may renegotiate parameters while network traffic is being pushed from the sender 202 to the receiver 204 (e.g., while the network flow is occurring, intermittent to the network flow, etc.). As described in greater detail below, the sender-side network device 206 may be configured to identify a protocol used by network flow traversing the device 206 between the sender 202 and receiver 206.

The system 200 may include a sender-side network device 206. The sender-side network device 206 may be arranged intermediary to the sender(s) 202 and receiver(s) 204. The sender-side network device 206 may be designed or implemented to receive network traffic from the sender(s) 202 for transmitting, routing, pushing, sending, conveying or otherwise forwarding to a corresponding receiver 204. The sender-side network device 206 may include a traffic analysis engine 214 and an encryption engine 216. The traffic analysis engine 214 may be any device, component, element, application, software, protocol, or other circuitry designed or implemented to analyze, parse, evaluate, or otherwise perform processing functions relating to traffic in the network flow traversing the sender-side network device 206. The encryption engine 216 may be any device, component, element, application, software, protocol, or other circuitry designed or implemented to selectively encrypt network packets (or portions of network packets) based on the network flow.

The traffic analysis engine 214 may be configured to identify a protocol used by the network flow traversing the network device 206. In some embodiments, network traffic from a plurality of senders 202 may traverse the network device 206, with the network traffic having respective protocols that may be same or different from one another. For instance, a first protocol may be used for network flow traversing the network device 206 from a first sender 202, and a second protocol may be used for network flow traversing the network device 206 from a network traffic from a second sender 202 may traverse the network device 206. The traffic analysis engine 214 may be configured to determine, detect, or otherwise identify the protocol used by the network flow traversing the network device 206 via various packets of the protocol.

In some embodiments, the traffic analysis engine 214 may be configured to identify the protocol during negotiation (or renegotiation) of the protocol between the sender 202 and receiver 204. For instance, during negotiation (or renegotiation), the sender 202 or receiver 204 may transmit a handshake packet (which may include one or more configurations, settings, encryption level, or other parameters of the protocol to be negotiated). The recipient (which may be the sender 202 or the receiver 204) may receive the handshake packet, and transmit an acknowledgment, acceptance, etc., of the handshake packet.

The sender-side network device 206 may be designed or implemented to intercept, identify, receive, or otherwise use the handshake packets (or other packets) exchanged between the sender and receiver 204 during negotiation (or renegotiation) of the protocol. The traffic analysis engine 214 may be configured to analyze, parse, or otherwise inspect the (e.g., clear text portion of the) intercepted packets for identifying the protocol. For example, the traffic analysis engine 214 may be configured to inspect the packets to identify characteristics of the encryption used to encrypt the packets. At least some protocols may use encryption schemes which encrypt data in a unique manner (e.g., using a particular type of encryption and/or a certain level of encryption). The traffic analysis engine 214 may be configured to identify the protocol based on the manner in which an intercepted packet was encrypted. As another example, the traffic analysis engine 214 may be configured to identify the protocol based on the handshake packet (e.g., according to the content and/or structure of the packet). The traffic analysis engine 214 may be configured to parse or analyze the handshake packet to extract identification information used to identify the protocol. Each protocol may use a specific type of handshake packet. The traffic analysis engine 214 may be configured to determine, detect, or otherwise identify the protocol based on a comparison with the handshake packet intercepted by the network device 206 with handshake packets used for various protocols.

In some embodiments, the traffic analysis engine 214 may be configured to identify one or more parameters of the encryption used by the protocol. The traffic analysis engine 214 may be configured to identify the parameters using analyzed, parsed, or inspected packets, based on the identified protocol itself, etc. For instance, the parameters may include a level of encryption (or a security parameter), a type or scheme of encryption, a key strength or complexity, and so forth. Each protocol may include corresponding parameters for encryption. For instance, some protocols may use one form or type of encryption, whereas other protocols may use a different form or type of encryption. However, each protocol may use a specific type of encryption, which may include various parameters. The traffic analysis engine 214 may be designed or implemented to determine, detect, look up, or otherwise identify one or more parameters of the encryption to be used by the protocol. The traffic analysis engine 214 may be configured to maintain, include, or otherwise access a table, database, or other data structure which includes parameters corresponding to various protocols. The traffic analysis engine 214 may be configured to access the data structure and cross-reference the identified protocol to identify the corresponding parameters.

In some embodiments, the traffic analysis engine 214 may be configured to identify an application of the network flow. As described above, the data source 210 may include or correspond to an application which is accessed by the receiver 204 and executing on the sender 202. The application may generate data (e.g., packets) which are transmitted through the network devices 206, 208 to the receiver 204. The traffic analysis engine 214 may be configured to trace, determine, track, or otherwise identify the application of the network flow using the packets of the network flow. The packets may include a header specifying, identifying, or otherwise indicating the sender 202 and recipient 204. The traffic analysis engine 214 may be configured to parse the packets to identify the sender 202 and, correspondingly, the application which generated the packet.

The traffic analysis engine 214 may be configured to apply a predetermined threshold to the protocols for the network flow through the network device 206 to determine whether or not the level of encryption for the respective protocols satisfy the predetermined threshold. The predetermined threshold may be set by a network administrator (e.g., for the receiver 204, for the sender 202, etc.). The predetermined threshold may correspond to the level of encryption. The traffic analysis engine 214 may be configured to determine whether the level of encryption satisfies the predetermined threshold for encrypting the network traffic, or for partially encrypting portions of the network traffic. For instance, where the protocols meet (e.g., satisfies, exceeds, etc.) the predetermined threshold, the encryption engine 216 may avoid encrypting (the already secured, protected or encrypted) portions of packets for the network flow corresponding to the protocol. Where one or more of the protocols do not meet the predetermined threshold, the encryption engine 216 may encrypt each of the packets for the network flow corresponding to those protocols (e.g., portions which were previously encrypted, and portions which were not encrypted), as described in greater detail below. Various non-limiting examples of protocols having encryption levels which may satisfy the predetermined threshold may include HTTPS, TLS, DTLS, SRTP, IPSec, OpenVPN, etc. The traffic analysis engine 214 may be configured to apply the predetermined threshold to the protocol to determine whether the level of encryption for the protocol meets the predetermined threshold.

The traffic analysis engine 214 may be configured to maintain, include, or otherwise access encryption rules corresponding to various applications, protocols, levels of encryption, etc. In some embodiments, the traffic analysis engine 214 may be configured to identify one or more encryption rules based on the application. For instance, certain applications may use a level of encryption (or protocol having a level of encryption) which correspond, correlate to, or are otherwise associated with particular encryption rules. In some embodiments, the traffic analysis engine 214 may be configured to identify one or more encryption rules based on the protocol (or level of encryption corresponding to the protocol) used for the network flow. The encryption rules may specify encryption of portions of packets network traffic (e.g., header information, payload information, negotiation or handshake packets, etc.). The traffic analysis engine 214 may be configured to determine, look-up, or otherwise identify the encryption rules for applying to the network flow to selectively encrypt (e.g., by the encryption engine 216) packets (or portions thereof) in accordance with the encryption rules.

The traffic analysis engine 214 may be configured to receive networks packets to be communicated between a sender 202 and a receiver 204. At least some of the network packets may include an encrypted portion (for instance, a payload) and an unencrypted portion (e.g., a portion including clear text information, such as a header or trailer). Some of the network packets may be fully encrypted. Each of the network packets may correspond to one of the protocols for network flow traversing the network device 206.

The encryption engine 216 may be configured to apply the encryption rules (e.g., identified by the traffic analysis engine 214) to the network packets corresponding to the respective protocols. Some network packets may include clear text information (e.g., unencrypted portions of the network packet). Some network packets may be encrypted using a protocol which does not satisfy the predetermined threshold. The encryption engine 216 may be configured to apply the encryption rules to the network packets received by the network device 206 to identify the various portions of packets and/or types of packets, and to selectively encrypt certain network packets (or portions thereof). In some embodiments, the encryption engine 216 may be configured to encrypt portions of the network packets having clear text information. As such, while the sender 202 may not have encrypted such portions, the encryption engine 216 of the sender-side network device 206 may be configured to encrypt those portions including clear text information or those packets or portions thereof that may not satisfy the predetermined threshold. Other portions of the network packet may include encrypted portions (e.g., encrypted according to a protocol which satisfies the predetermined threshold). In such instances, the encryption engine 216 may bypass, forego or avoid encrypting such portions (e.g., the payload of the packet, for instance) which are encrypted. The encryption engine 216 may be configured to encrypt portions of the network packets to be forwarded (e.g., via the tunnel) to the receiver-side network device 208.

In some implementations, the network packets may be encrypted according to a protocol which does not meet the predetermined threshold. For instance, a second protocol of a second network flow may have a level of encryption which falls below the predetermined threshold. The sender-side network device 206 may be configured to receive such network packets corresponding to the network flow. The encryption engine 216 may be configured to encrypt the network packets corresponding to the second network flow. In some implementations, the encryption engine 216 may be configured to encrypt both the encrypted portions and the unencrypted portions (e.g., portions of the network packets containing or including clear text information). As such, the sender 202 may encrypt a portion of the network packet (e.g., using a protocol having a level of encryption which falls below the predetermined threshold), and the sender-side network device 206 may be configured to encrypt the same portion of the network packet. The encryption engine 216 may be configured to encrypt such portions of the network packet so that the level of encryption meets, satisfies, or exceeds the predetermined threshold. Hence, some portions of the network packet may be encrypted twice (e.g., a first layer of encryption and a second layer of encryption).

The sender-side network device 206 may be configured to forward or send the network packet(s) via a tunnel to the receiver-side network device 208. The sender-side network device 206 may be configured to forward the encrypted network packets (e.g., packets which were encrypted by the sender 202 and packets which were encrypted by both the sender 202 and sender-side network device 206) to the receiver-side network device 208. The network packets may include portions which were encrypted by sender 202 and portions which were encrypted by the sender-side network device 206. Some portions may be encrypted both by the sender 202 and by the sender-side network device 206. The sender-side network device 206 may be configured to forward the network packets to the receiver-side network device 208 via a tunnel. The tunnel may be a virtual tunnel formed between the sender and receiver-side network device 206, 208. The tunnel may be formed during negotiation of the protocol. The sender-side network device 206 may be configured to establish and/or identify the tunnel to use for forwarding the network packets based on the receiver 204 which is to receive the network packet(s). The sender-side network device 206 may be configured to forward the network packets using a network address corresponding to the receiver-side network device 208 or the receiver 204.

As shown in FIG. 2, the system 200 may include a receiver-side network device 208. The receiver-side network device 208 may be arranged intermediary to the sender-side network device 206 and the receivers 204. The receiver-side network device 208 may be configured to receive the network packets from the sender-side network device 206 (e.g., via the tunnel formed or established between the sender and receiver-side network device 206, 208). The receiver-side network device 208 may be configured to receive the network packets on behalf of the receiver 204. As described in greater detail below, the receiver-side network device 208 may be configured to (at least partially) decrypt the network packets for forwarding to the receiver 204.

The receiver-side network device 208 may include a decryption engine 218. The decryption engine 218 may be similar in some respects to the encryption engine 216 of the sender-side network device 206. The decryption engine 218 may be any device, component, element, application, software, protocol, or other circuitry designed or implemented to selectively decrypt network packets (or portions of network packets) received from the sender-side network device 206. The decryption engine 218 may be configured to identify, detect, or otherwise determine that network packets received via the tunnel from the sender-side network device 206 were encrypted by the sender-side network device 206 (e.g., based on an initial packet, based on a format of the network packets, based on the manner in which the network packets were encrypted being different from the encryption method used by the sender 202, etc.). The decryption engine 218 may be configured to identify those network packets encrypted by the encryption engine 216.

The decryption engine 218 may be configured to decrypt portions of the network packets which were encrypted by the encryption engine 216. The decryption engine 218 and encryption engine 216 may use or implement a common encryption scheme (for instance, a public and private key scheme), which may be different from the encryption scheme implemented by the sender 202. Thus, the decryption engine 218 may be configured to decrypt network packets which were encrypted by the encryption engine 216. The decryption engine 218 may be configured to decrypt portions of the network packets that has the clear text information (for instance, header information, trailer information, negotiation or renegotiation packets containing handshake information, and other portions or network packets containing unencrypted or clear text information) encrypted by the sender-side network device.

The decryption engine 218 may be configured to decrypt portions of the network packets which were encrypted by both the sender 202 and the sender-side network device 206. The decryption engine 218 may be configured to decrypt such portions to revert the portion of the network packet to the encryption performed by the sender 202. Hence, rather than wholly decrypting portions having two layers of encryption (e.g., one by the sender 202 and another by the sender-side network device 206), the decryption engine 218 may be configured to decrypt one layer of the encryption such that the portion of the network packet has one layer of encryption (e.g., by the sender 202).

The receiver-side network device 208 may be configured to forward, provide, or otherwise transmit the decrypted network packet(s) to the receiver 204. The receiver-side network device 208 may be configured to transmit partially decrypted network packets to the receiver for further decryption or decoding by the receiver 204. The receiver 204 may be configured to receive the partially (or fully) decrypted network packets. The receiver 204 may include a decoder 220. The decoder 220 may be similar in some respects to the encoder 212 of the sender 202. The decoder 220 may be any device, component, element, application, software, protocol, or other circuitry designed or implemented to decrypt or decode data received from a sender 202. The decoder 220 may be configured to decode data which was encoded or encrypted by the encoder 212 of the sender 202. The decoder 220 may be configured to decode or decrypt data in accordance with the protocol for the network flow between the sender 202 and receiver 204. Hence, in some instances, network packets may undergo two layers of encoding and decoding. A first layer of encoding and decoding may be performed by the sender 202 and receiver 204, and a second layer of encoding and decoding may be performed by the sender-side network device 206 and the receiver-side network device 208. Such implementations and embodiments may ensure the data transmitted or exchanged between senders and receivers 202, 204 is sufficiently protected through multiple layers of encoding/encryption.

Figure 3:
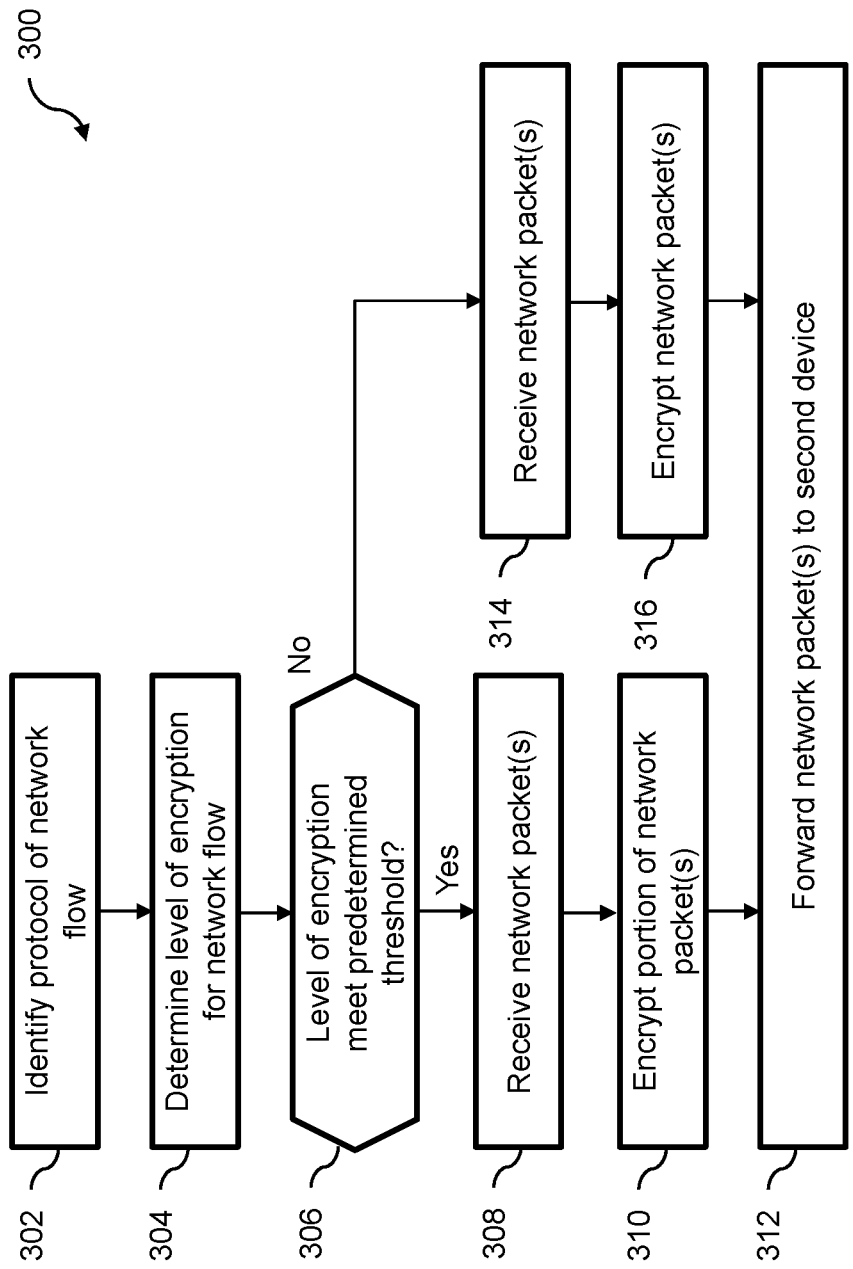
FIG. 3 is a flow chart showing a method for selective encryption of tunneled traffic, in accordance with an illustrative embodiment.

Referring now to FIG. 3, an implementation of a method 300 for selective encryption of traffic (e.g., tunneled encrypted traffic) will be described. In brief overview of method 300, at step 302, a first device identifies a protocol of network flow. At step 304, the first device determines a level of encryption for the network flow. At step 306, the first device determines whether the level of encryption meets a predetermined threshold. At step 308, where the level of encryption meets the predetermined threshold, the first device may receive network packets. At step 310, the first device may encrypt a portion of the network packets. At step 312, the first device may forward the network packet(s) to a second device. At step 314, where the level of encryption does not meet the predetermined threshold, the first device may receive network packets. At step 316, the first device may encrypt the network packets.

At step 302, and in some embodiments, a first device identifies a protocol of network flow. In some embodiments, the first device may identify a protocol used by a network flow traversing the first device via one or more packets of the protocol. The first device may be arranged intermediary to a plurality of senders and a plurality of receivers. The first device may receive the one or more packets of the protocol from a sender of the plurality of senders. The first device may intercept packets of the network protocol to be sent (e.g., by the sender) to a receiver of the plurality of receivers. The first device may identify the protocol using the packets sent, transmitted, forwarded, or otherwise provided by the sender to the receiver. The first device may identify the protocol in packets that are initially exchanged between the sender and receiver through the first device (e.g., during negotiation of the protocol).

In some embodiments, the first device may identify the protocol during one of negotiation or renegotiation of the protocol between the sender and the receiver. In some instances, the sender and receiver may negotiate the protocol initially (e.g., prior to transmitting, providing, or otherwise exchanging data between the sender and receiver). In some instances, the sender and receiver may negotiate (or re-negotiate) intermittently (e.g., between, during, or while packets are exchanged between the sender and receiver). The sender and receiver may negotiate the protocol by exchanging handshake packets (or other negotiation packets). The first device may intercept the packets exchanged between the sender and receiver during negotiation of the protocol. The first device may parse the packet(s) to identify the protocol.

In some embodiments, the first device may identify one or more parameters of the encryption for or used by the protocol. Each protocol may use, correspond to, implement, or otherwise be associated with one or more parameters of encryption. For instance, a protocol may correspond to a particular parameter or set of parameters. The first device may identify the parameters which are associated with the particular protocol. The first device may identify the parameters by cross-referencing the identified protocol with a list of protocols and their associated parameters. The parameters may include a type of encryption, a level of encryption, an application which transmitted the packets, a sender, a receiver, etc. The first device may parse the one or more packets to identify the parameters of the encryption.

In some embodiments, the first device may identify encryption rules based on or according to the parameters. The first device may identify the encryption rules based on the parameters including, for instance, the level of encryption, the application which generated the data received from the sender by the first device, etc. The encryption rules may include, for instance, rules in which the sender encrypts data to be transmitted from the sender to a receiver. The first device may identify the encryption rules corresponding to the protocol. The first device may identify the encryption rules corresponding to the protocol in which the sender and receiver negotiated for network flow between the sender and the receiver.

In some embodiments, the first device may identify an application of the network flow. The application may be the application residing, executing, hosting, or otherwise corresponding to the sender which generates packets for transmission to the receiver. The first device may identify the application based on the packets exchanged between the sender and receiver. In some implementations, the first device may identify the application based on header information included in the packet. The header may specify the application which generated the packets. The first device may parse the packets to identify the application which generated, transmitted, or otherwise corresponds to the network flow.

In some embodiments, first device may identify encryption rules for partially encrypting portions of the network traffic (e.g., by the first device). The first device may identify the encryption rules based on the protocol corresponding to the network flow, based on the sender, based on the receiver, etc. The first device may identify the encryption rules based on the application which generated the packets. The first device may identify the encryption rules by cross-referencing the protocol, sender, receiver, application, etc., with a list, database, or other data structure including corresponding protocols and encryption rules. The first device may identify the encryption rules from within the data structure.

At step 304, and in some embodiments, the first device determines a level of encryption for the network flow. The first device may determine the level of encryption based on the identified parameters corresponding to the protocol. The first device may determine the level of encryption responsive to receiving the data from the sender to the receiver.

At step 306, and in some embodiments, the first device determines whether the level of encryption meets a predetermined threshold. The first device may retrieve, identify, maintain, or otherwise access a predetermined (e.g., defined or specified) threshold. The predetermined threshold may correspond to a protocol of a plurality of protocols identified for network traffic. The first device may apply the predetermined threshold to the identified protocol (e.g., at step 302). The first device may apply the predetermined threshold to determine whether the level of encryption for the network flow meets the predetermined threshold. In some instances, the level of encryption for network flow corresponding to a first sender may meet the predetermined threshold, and a level of encryption for network flow corresponding to a second sender may not meet the predetermined threshold. Where the level of encryption meets the predetermined threshold, the method 300 may proceed to step 308. Where the level of encryption does not meet the predetermined threshold, the method 300 may proceed to step 314.

At step 308, and in some embodiments, where the level of encryption meets the predetermined threshold, the first device may receive network packets. The first device may receive one or more network packets to be communicated between a sender and a receiver. The network packets may include a first portion which is encrypted and a second portion that has clear text information. The first device may receive the one or more network packets as the network packets traverse the network flow from the sender to the receiver. The first device may receive network packets prior to the network packets being delivered to the receiver. The first device may apply the encryption rules to the network packets for selectively encrypting portions of the network packets, as described in greater detail below.

At step 310, and in some embodiments, the first device may encrypt a portion of the network packets. In some embodiments, the first device may encrypt the second portion of the packets based on the protocol. As described above, the protocol may specify encryption of some portions of the network packets (e.g., payload data, for instance) while other portions of the network packets may remain unencrypted (e.g., containing clear text information). The first device may encrypt the portion of the network packet including clear text information. As such, the first device may encrypt the second portion of the network packet such that the network packet is fully encrypted (e.g., all portions of the network packet is encrypted). In some embodiments, the first device may encrypt the portions of the network packets corresponding to the network traffic according to the encryption rules (e.g., identified as described above). In some embodiments, the first device may encrypt the second portion of the network packets while avoiding encrypting the first portion of the network packets (e.g., the portions of the network packet which were encrypted by the sender).

At step 312, and in some embodiments, the first device may forward (e.g., route or send) the network packet(s) to a second device. In some embodiments, the first device may forward the network packets with the first portion (e.g., which was encrypted by the sender) and the encrypted second portion (e.g., which was encrypted by the first device at step 310) via a tunnel to a second device. The second device may be located, arranged, or otherwise situated intermediary to the plurality of senders and the plurality of receivers for decryption of the encrypted second portion for forwarding to the receiver. The first device may forward the network packets for decryption by the second device.

In some embodiments, the second device may receive the network packets from the first device. The second device may receive the network packets via the tunnel. The second device may receive the network packets for decrypting (e.g., by the second device) and forwarding from the second device to the receiver. The second device may decrypt the encrypted portions of the network packet (e.g., encrypted at step 310). The second device may decrypt the encrypted portions of the network packet which were encrypted at step 310, while maintaining the portions of the network packet encrypted by the sender and received at step 308.

At step 314, and in some embodiments, where the level of encryption does not meet the predetermined threshold, the first device may receive network packets. Step 314 may be similar in some respect to step 308. In some instances, the network packets received at step 314 may include a first portion (e.g., which was encrypted according to a protocol which does not meet the predetermined threshold) and a second portion (e.g., which includes clear text information). In some instances, the network packets received at step 314 may include clear text information. In some embodiments, a plurality of network flow may traverse the first device. A first protocol of a first network flow may have a level of encryption which meets the predetermined threshold, and a second protocol of a second network flow may have a level of encryption below the predetermined threshold. In such instances, the packets corresponding to the first protocol may be encrypted according to step 310 and the packets corresponding to the second protocol may be encrypted according to step 316, as described in greater detail below.

At step 316, and in some embodiments, the first device may encrypt the network packets. In some embodiments, the first device may encrypt the entirety of the network packets. The first device may encrypt both the unencrypted portions of the second network flow and the encrypted portions of the second network flow. As such, at least some portions of the packets corresponding to the second network flow may include two layers of encryption (e.g., a first layer of encryption performed by the sender and a second layer of encryption performed by the first device). The first device may encrypt the network packets for transmission via the tunnel. From step 316, the method 300 may proceed to step 312, where the first device transmits the network packets to the second device. The second device may decrypt network traffic received from the first device, and forward the network traffic to the receiver. The receiver may decrypt the network traffic received from the second device according to the protocol negotiated between the sender and the receiver.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method for selectively encrypting and decrypting portions of a network flow by intermediary devices, the method comprising:
   (a) receiving, by a first device intermediary to a plurality of senders and a plurality of receivers, one or more networks packets to be communicated between a sender of the plurality of senders and a receiver of the plurality of receivers, the one or more packets comprising a first portion that is encrypted and a second portion that has clear text information;
   (b) identifying, by the first device, an application of a network flow comprising the one or more packets traversing the first device or the sender of the one or more packets, via the one or more packets;
   (c) determining, by the first device based at least on the application or the sender, that the first portion of the one or more network packets of the network flow is encrypted and that a level of encryption for the first portion fails to meet a predetermined threshold;
   (d) encrypting, by the first device based on the level of encryption failing to meet the predetermined threshold, the first portion of the one or more packets and the second portion of the one or more packets; and
   (e) forwarding, by the first device, the one or more network packets with the encrypted first portion and the encrypted second portion via a tunnel to a second device intermediary to the plurality of senders and the plurality of receivers for decryption of the encrypted first portion and the encrypted second portion for forwarding to the receiver.

2. The method of claim 1, wherein (b) further comprises identifying a protocol of the network flow during one of negotiation or renegotiation of the protocol between the sender and the receiver.

3. The method of claim 2, further comprising identifying one or more parameters of the encryption to be used by the protocol.

4. The method of claim 1, wherein (b) further comprises performing, by the first device, inspection of the one or more packets to identify one of a protocol of the network flow or the level of encryption.

5. The method of claim 1, further comprising identifying, by the first device, one or more encryption rules to partially encrypt portions of network traffic based at least on the application.

6. The method of claim 5, further comprising encrypting, by the first device, portions of the network traffic according to the one or more encryption rules.

7. The method of claim 1, further comprising determining, by the first device, that a second protocol of a second network flow for a second application has a second level of encryption above the predetermined threshold.

8. The method of claim 7, further comprising foregoing encrypting, by the first device, encrypted portions of the second network flow for transmission via the tunnel.

9. A system for selectively encrypting and decrypting portions of a network flow by intermediary devices, the system comprising:
   a first device comprising one or more processors, coupled to memory and intermediary to a plurality of senders and a plurality of receivers;
   wherein the first device is configured to:
   receive one or more networks packets to be communicated between a sender of the plurality of senders and a receiver of the plurality of receivers, the one or more packets comprising a first portion that is encrypted and a second portion that has clear text information;

identify an application of a network flow comprising the one or more packets traversing the first device or the sender of the one or more packets, via the one or more packets;

determine, based at least on the application or the sender, that the first portion of the one or more network packets of the network flow is encrypted and that a level of encryption for the first portion of fails to meet a predetermined threshold;

encrypt, based on the level of encryption failing to meet the predetermined threshold, the first portion of the one or more packets and the second portion of the one or more packets; and forward, the one or more network packets with the encrypted first portion and the encrypted second portion via a tunnel to a second device intermediary to the plurality of senders and the plurality of receivers for decryption of the encrypted first portion and the encrypted second portion for forwarding to the receiver.

10. The system of claim 9, wherein the first device is further configured to identify a protocol of the network flow during one of negotiation or renegotiation of the protocol between the sender and the receiver.

11. The system of claim 10, wherein the first device is further configured to identify one or more parameters of the encryption to be used by the protocol.

12. The system of claim 9, wherein the first device is further configured to perform inspection of the one or more packets to identify one of a protocol of the network flow or the level of encryption.

13. The system of claim 9, wherein the first device is further configured identify one or more encryption rules to partially encrypt portions of network traffic based at least on the application.

14. The system of claim 13, wherein the first device is further configured to encrypt portions of the network traffic according to the one or more encryption rules.

15. The system of claim 9, wherein the first device is further configured to determine that a second protocol of a second network flow for a second application has a second level of encryption above the predetermined threshold.

16. The system of claim 15, wherein the first device is further configured to forego encryption of encrypted portions of the second network flow for transmission via the tunnel.

* * * * *